United States Patent

Bragas

[15] 3,670,113

[45] June 13, 1972

[54] VIDEO TRANSDUCER HEAD ALIGNMENT APPARATUS

[72] Inventor: Peter Bragas, Itzum, Germany

[73] Assignee: Blaupunkt-Werke GmbH, Hildesheim, Germany

[22] Filed: Oct. 8, 1970

[21] Appl. No.: 79,068

[30] Foreign Application Priority Data

Oct. 17, 1969 Germany ......................P 19 52 369.4

[52] U.S. Cl. ................179/100.2 B, 29/603, 179/100.2 CA, 179/100.2 T

[51] Int. Cl. ........................................G11b 5/42, G11b 5/56

[58] Field of Search ...........179/100.2 CA, 100.2 R, 100.2 B, 179/100.2 T; 29/603

[56] References Cited

UNITED STATES PATENTS 3,375,439 3/1968 Yamamoto......................179/100.2 B 3,286,041 11/1966 Nishiwaki.....................179/100.2 CA

FOREIGN PATENTS OR APPLICATIONS 1,522,975 10/1969 Germany.........................179/100.2 B

*Primary Examiner*—Bernard Konick
*Assistant Examiner*—Jay P. Lucas
*Attorney*—Flynn & Frishauf

[57] ABSTRACT

To align transducer heads on a rotating carrier, so that the gap extends exactly radially and is properly placed on the carrier, a drum-shaped support is provided with magnetic transducer heads (preferably similar to the video heads) facing inwardly and accurately located to define the orientation of the video transducers on their carrier. One of the heads is energized and the signal read from the other. The head on the carrier is then adjusted until the observed signal is a maximum, which will occur only upon accurate alignment. The heads are then fixed in place on the carrier by means of an adhesive, for example introduced in grooves between the carrier and the head.

8 Claims, 4 Drawing Figures

VIDEO TRANSDUCER HEAD ALIGNMENT APPARATUS

The present invention relates to videotape equipment and more particularly to the adjustment of video transducer heads on rotating carriers.

The video transducer heads, on carriers, are usually offset with respect to each other by predetermined angle. The direction of the air gap of the heads must be exactly radially with respect to the center of the carrier; the distance between the polished faces of the transducer heads must be within a predetermined tolerance which is very low.

The accuracy of placement of video transducer heads must be very high. Thus, to provide for adjustment of video transducer heads on carriers, substantial measuring equipment and time is required, since the adjustment must be in accordance with 4 parameters. The tolerances with which the video heads are to be adjusted are in the region of microns. Such tolerances require the use of precision instruments of extreme accuracy.

The criteria according to which the video heads are to be adjusted are: equal height of the heads on the carrier; tolerance about $\pm 5\ \mu$. Distance of polished faces of the transducer head with respect to diameter of the carrier; tolerance about $\pm 10\ \mu m$. Direction of air gap of transducer heads with respect to the center of the carrier; tolerance ± 3 inches. Angular deviation of position of transducer head with respect to an adjacent head. Tolerance approximately ± 3 inches.

To enable these small tolerances to be held, the transducer heads themselves are very accurately manufactured. Tolerance for the housing of the transducer heads themselves need be very low itself, for example $\pm 1.5\ \mu m$. The back side of the transducer heads are accurately curved, that is accurately match the radius of the carrier and fit into an equally accurately cut groove of the carrier. This accurate manufacture of these portions of the transducer heads as well as of the carrier, which do not have a functional effect with respect to the electrical transducing requirement of the head itself, greatly increase the cost of the entire assembly and also of the heads themselves.

It is an object of the present invention to provide a head carrier testing and adjustment jig which permits adjustment of transducer heads on head carriers to be done quickly and without the use of expensive test equipment, particular microscopes, while still maintaining the tolerances referred to.

SUBJECT MATTER OF THE PRESENT INVENTION

Briefly, a drum-shaped support is provided which has transducer heads, for example similar to the transducer heads to be mounted, placed thereon. This drum-shaped support is accurately made and the transducer heads are once, accurately positioned opposite the locations at which transducer heads on the head carrier are to be placed. A head carrier is then inserted within the drum-shaped support. A signal is applied to one of the heads, preferably to the stationary heads on the drum and the induced signal in the heads on the carrier is measured. The heads on the carrier are then adjusted till this signal is a maximum, whereupon the head on the carrier will be in alignment.

In accordance with the feature of the invention, the heads are then locked to the carrier by means of an adhesive, for example epoxy, introduced in grooves between the head and the carrier. These grooves may be formed on the carrier face itself.

The carrier is mounted within the drum to be exactly centered, without play. Prior to adhering the heads to the head carrier, an adjustable preferably spring loaded holding arrangement is provided.

By use of the foregoing apparatus, video transducer heads can be accurately placed on a head carrier and aligned, without requiring high precision measuring instruments. The outside dimensions of the housings of the video heads themselves need not be accurately machined. The only adjustment still requiring highly accurate apparatus is the adjustment of the air gap of the heads and the distance of the polished face of the head from the center of the carrier.

The invention will be described by way of example with reference to the accompanying drawings, wherein.

Figure 1:
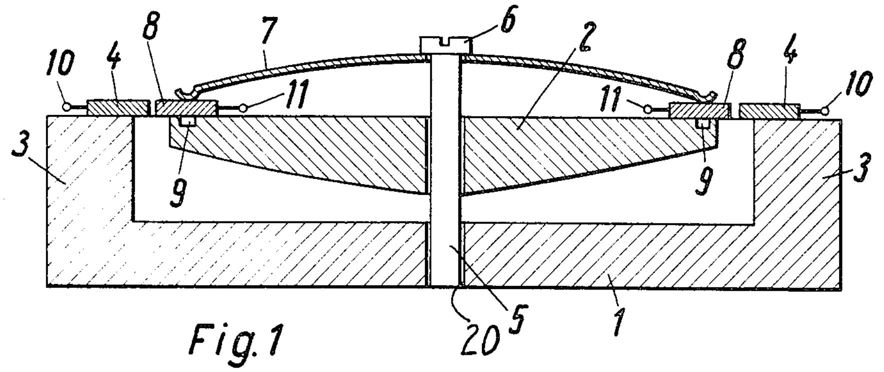
FIG. 1 is a cross-sectional schematic view of a video head carrier within an adjustment drum.
Figure 2:
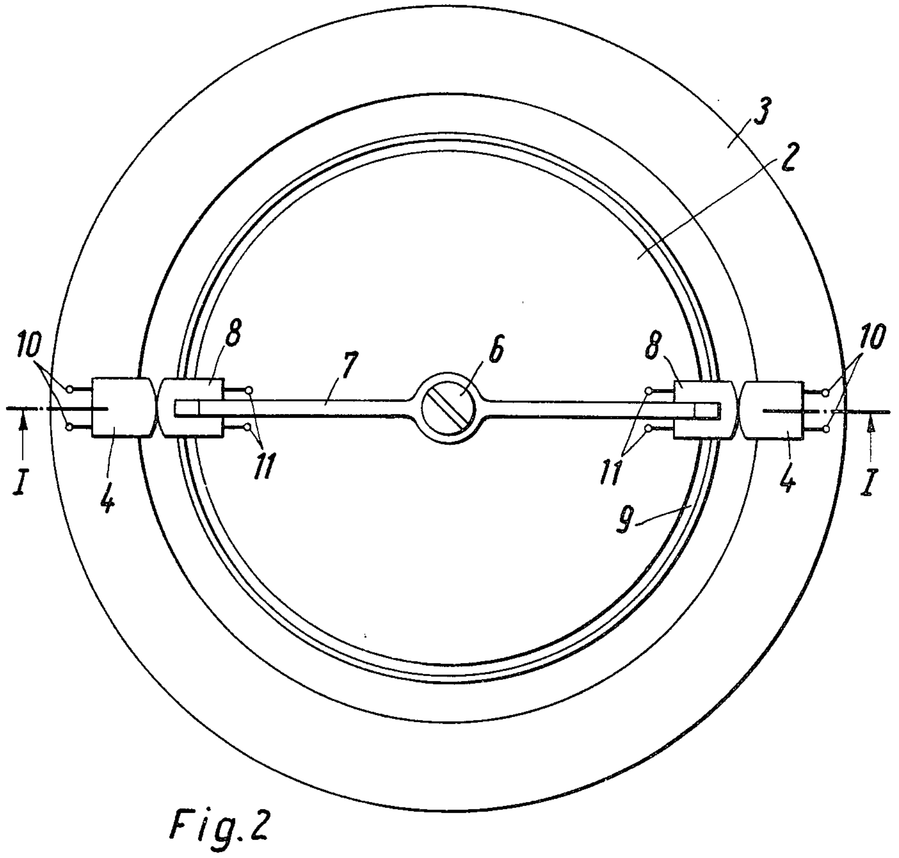
FIG. 2 is a top view of the carrier within the drum.

An adjustment drum 1 has a carrier for video transducer heads mounted therein. The carrier itself is a disc-shaped element 2, secured on a shaft 5 exactly in center of the drum 1, without play. Shaft 5 can rotate in a bearing 20. The edge of drum 1 is upturned and has a pair of magnetic transducer heads 4 located thereon; heads 4 preferably are similar to the heads to be adjusted, that is, they are also video-type transducer heads. The upper end of shaft 5 is formed with a screw thread, into which a screw 6 can be inserted, to hold a leaf spring, or bowed flat disc spring 7 in place. Disc spring 7, during adjustment, frictionally and resiliently holds the video transducer heads 8 to the upper side of the carrier 2. The heads 8 can be moved, against the frictional force, of spring 7. A circular groove 9 is cut near the edge of the head carrier 2. When a head has been properly adjusted, an adhesive, such as epoxy or the like is inserted within groove 9 to flow therein beneath the head 8 and secured the heads 8 in position. The adhesive, flowing beneath the heads 8 thus will not form a layer of adhesive beneath the heads and between the carrier 2, to possibly cause misalignment.

Magnetic heads 8 are connected to terminals 11; magnetic heads 4 are connected to terminals 10. An alternating signal $U_1$, indicated at 14 (FIG. 3) is connected across the terminals 10 which connect with windings 12 of head 4. Winding 13 of head 8 is connected to the terminals 11, and thereover to a measuring instrument 15 which will have a voltage $U_2$ induced therein.

Figure 3:
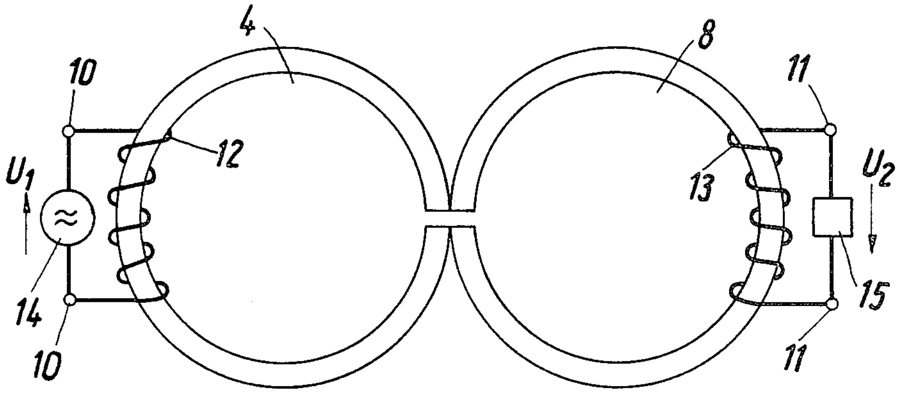
FIG. 3 is a schematic diagram illustrating a pair of magnetic heads, one to be located on the drum and the other on the carrier, with which the air gaps match both as far as location and as far as attitude, that is orientation, is concerned.
Figure 4:
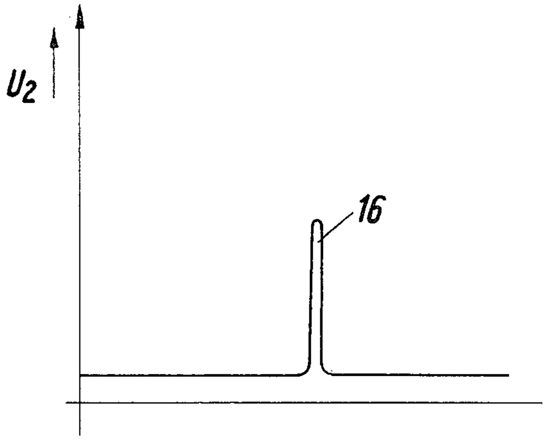
FIG. 4 is a schematic voltage diagram illustrating illustrating the voltage induced in the transducer head on the carrier.

Adjustment of heads: voltage $U_1$, connected to winding 12 of the fixed head 4 will induce a voltage in winding 13 to be read on meter 15. The video head 8 is moved slowly past magnetic head 4. Due to the radius of the polished face of the head, and the extremely small air gap, in the order of $1\ \mu m$, the voltage induced in video head 8 will be only very small. The magnetic short circuit formed by the core of the video transducer head prevents induction in coil 13 of a larger voltage. When the two air gaps of the heads are, however, exactly aligned, so that the edges of the air gap are in alignment as seen in FIG. 3, then effects of magnetically shunting of the field are eliminated and the voltage $U_1$ is transferred to the winding 13 of head 8 with maximum amplitude. The rise in voltage is very steep and provides a marked peak easily observed on meter 15, as indicated in the diagram FIG. 4. When the peak voltage 16 is observed on meter 15, then head 8 is aligned with respect to head 4, and represents its proper position. Even the smallest deviation of head 8, both with respect to radial misalignment, as well as angular misplacement would immediately cause a magnetic shunt to appear in front of stationary head 4 and a sharp drop of voltage $U_2$. Thus, the peaked output on meter 15 provides an accurate indication of exact alignment.

The video transducer heads can be adjusted on the carrier quickly and reliably. All 4 adjustment criteria are met. The requirement that the video heads are in one plane can be met by working on, or suitably shaping the surface of the head carrier. Distance of the polished faces of the video heads, with respect to each other, is determined by the position of fixed heads 4 with respect to each other which is set once, upon first making the drum-shaped carrier and placing the heads thereon.

By first accurately providing a standard placement of the fixed heads 4 on drum 1, both the angular spacing between the heads, as well as the direction, that is the attitude of the heads will be determined. All requirements of adjustment will then be met when voltage $U_2$, read on meter 15, has reached a maximum peak (see FIG. 4).

Some apparati, for example some which utilize semiconductor units require offset of the video transducer heads in various planes, rather than alignment in one single plane. The apparatus can readily be modified to serve as a standard comparison also for such heads; it is only necessary to re-set the vertical alignment of the fixed heads 4 on the edge 3 of drum 1 as required.

The magnetic transducer heads 4 do not have to be of any special kind; preferably they are simply video transducer heads of the same type as those to be adjusted, accurately aligned. The accuracy requirements will thus be met.

I claim:

1. Video tape transducer head alignment apparatus to align video transducer heads on a rotatable head carrier (2) with respect to the center so that the gaps of the heads (8) are oriented toward the center and the distance between the faces of the transducer heads across the carrier is between predetermined tolerances, comprising
- a drum-shaped support (1);
- a plurality of standard magnetic transducer heads (4) located on the drum-shaped support and facing inwardly thereof, the transducer heads being spaced along the inner rim (3) of the drum-shaped support by the distances required by the spacing of the transducer heads on the carrier;
- means journalling said carrier (2) to be rotatable within said drum;
- a signal source (14) connected to apply an a-c signal ($U_1$) to one of the heads (4);
- and signal reading means (15) connected to the head opposite the one head having said signal applied thereto whereby, upon proper alignment of the transducer head with respect to the standard head (4) the signal being read on said reading means will be a maximum ($U_2$–16).

2. Apparatus according to claim 1, wherein said transducer heads (4) are adjustably mounted on said carrier (2).

3. Apparatus according to claim 2, including at least one groove formed at adjacent surfaces of said carrier and said transducer heads;
- and adhesive introduced into said groove to lock said head in place on said element.

4. Apparatus according to claim 1, wherein the standard heads (4) are video transducer heads.

5. Apparatus according to claim 4, wherein the standard heads and the transducer heads are similar.

6. Method to adjust a transducer head, adjustably mounted on a rotatable head carrier (2) with respect to the center so that the gaps of the heads (8) are oriented toward the center and the distance between the faces of the transducer heads across the carrier is between predetermined tolerances in which a plurality of standard magnetic transducer heads (4) are located on a drum-shaped support and facing inwardly thereof, the transducer heads being spaced along the inner rim (3) of the drum-shaped support by the distances required by the spacing of the transducer heads on the carrier;
- a signal source (14) is connected to apply an a-c signal ($U_1$) to one of the heads (4);
- and signal reading means (15) are connected to the head opposite the one head having said signal applied thereto;
- said method comprising
- energizing said signal source;
- measuring the induced signal on said signal reading means;
- adjusting said head until the measured signal is a maximum signal;
- and locking said transducer head in place.

7. Method according to claim 6, wherein the step of locking the transducer head in place comprises the step of adhering said head to said carrier.

8. Method according to claim 6, including at least a groove formed at adjacent surfaces of said carrier and said transducer head, wherein the step of locking the transducer head in place comprises the step of adhering said head to said carrier and introducing an adhesive into said groove.

* * * * *